United States Patent [19]

Furuta

[11] 4,425,760

[45] Jan. 17, 1984

[54] BRAKE BOOSTER WITH REACTION DISC PLATE AND CYLINDRICAL MEMBER

[75] Inventor: Yoichi Furuta, Chiryu, Japan

[73] Assignee: Aisin Seiki Company, Limited, Kariya, Japan

[21] Appl. No.: 206,394

[22] Filed: Nov. 13, 1980

[30] Foreign Application Priority Data

Nov. 14, 1979 [JP] Japan .......................... 54-158484[U]

[51] Int. Cl.³ .......................... F15B 9/10; B60T 13/00
[52] U.S. Cl. .................................. 60/547.1; 91/369 A
[58] Field of Search ............. 91/369 A, 369 B, 369 R; 60/547.1

[56] References Cited

U.S. PATENT DOCUMENTS

| | | | |
|---|---|---|---|
| 3,132,567 | 5/1964 | Ingres et al. | 91/369 A |
| 3,172,334 | 3/1965 | Wuellner et al. | 91/369 A |
| 3,727,516 | 4/1973 | Myers et al. | 91/369 A |
| 4,354,423 | 10/1982 | Ohmi et al. | 91/369 A |

Primary Examiner—Paul E. Maslousky
Attorney, Agent, or Firm—Oblon, Fisher, Spivak, McClelland & Maier

[57] ABSTRACT

A brake booster for an automobile which includes a reaction disc plate disposed within a central bore of a power piston, one surface of the reaction disc plate contacting the cylindrical member and an opposite side surface contacting force transmitting means wherein one side surface of the reaction disc plate includes a rounded surface complementary to a rounded surface provided on the cylindrical member. A combined cylindrical member and reaction disc plate are utilized such that no space or gap is formed between the cylindrical member and reaction plate so as to shorten the length of the cylindrical member and decrease the time necessary for initiation of brake operation of the brake booster.

5 Claims, 3 Drawing Figures

BRAKE BOOSTER WITH REACTION DISC PLATE AND CYLINDRICAL MEMBER

BACKGROUND OF THE INVENTION

1. Field of the Invention

This invention relates generally to a brake booster for automobiles, and more particular, to a vacuum brake booster which includes a power piston, a push rod connected to a brake pedal, an output rod operatively connected to a brake master cylinder piston, a reaction plate interposed between the push rod and a power piston and a valve mechanism for actuating the power piston.

2. Description of the Prior Art

Conventionally, the relationship between a cylindrical member and a reaction plate member is as shown in FIG. 3, wherein a gap 35 is formed between a reaction disc plate 29' and a cylindrical member 27' of a brake booster assembly. Under this condition, when the brake pedal is depressed for brake operation, the initial stage of the operation is ineffective until the reaction disc plate 29' is deformed to completely occupy gap 35.

It has therefore been necessary to provide a rounded portion 29'a at opposite ends of the reaction disc plate 29' in order to avoid any difficulty with improper reverse insertion of the plate 29' into cylindrical portion 26' of power piston 5'. It has also been necessary to provide a sufficient length (l) of the cylindrical member 27' in order to provide sufficient relative movement between the power piston 5' and the member 27'.

SUMMARY OF THE INVENTION

It is therefore an object of this invention to provide a brake booster assembly having an improved reaction disc plate and cylindrical member which avoids the drawbacks of the prior art.

It is a further object of the present invention to provide a reaction disc plate disposed within a central cylindrical bore of a power piston, one side surface of the reaction disc plate contacting the cylindrical member and an opposite side surface contacting with an air valve wherein one side surface of the reaction disc plate includes a rounded surface complementary to a rounded surface provided on the cylindrical member.

It is a further object of the present invention to provide a combined member and reaction disc plate such that no space or gap is formed between the cylindrical member and reaction plate so as to shorten the length of the cylindrical member and decrease the time necessary for initiation of brake operation of the brake booster.

BRIEF DESCRIPTION OF THE DRAWINGS

Various objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
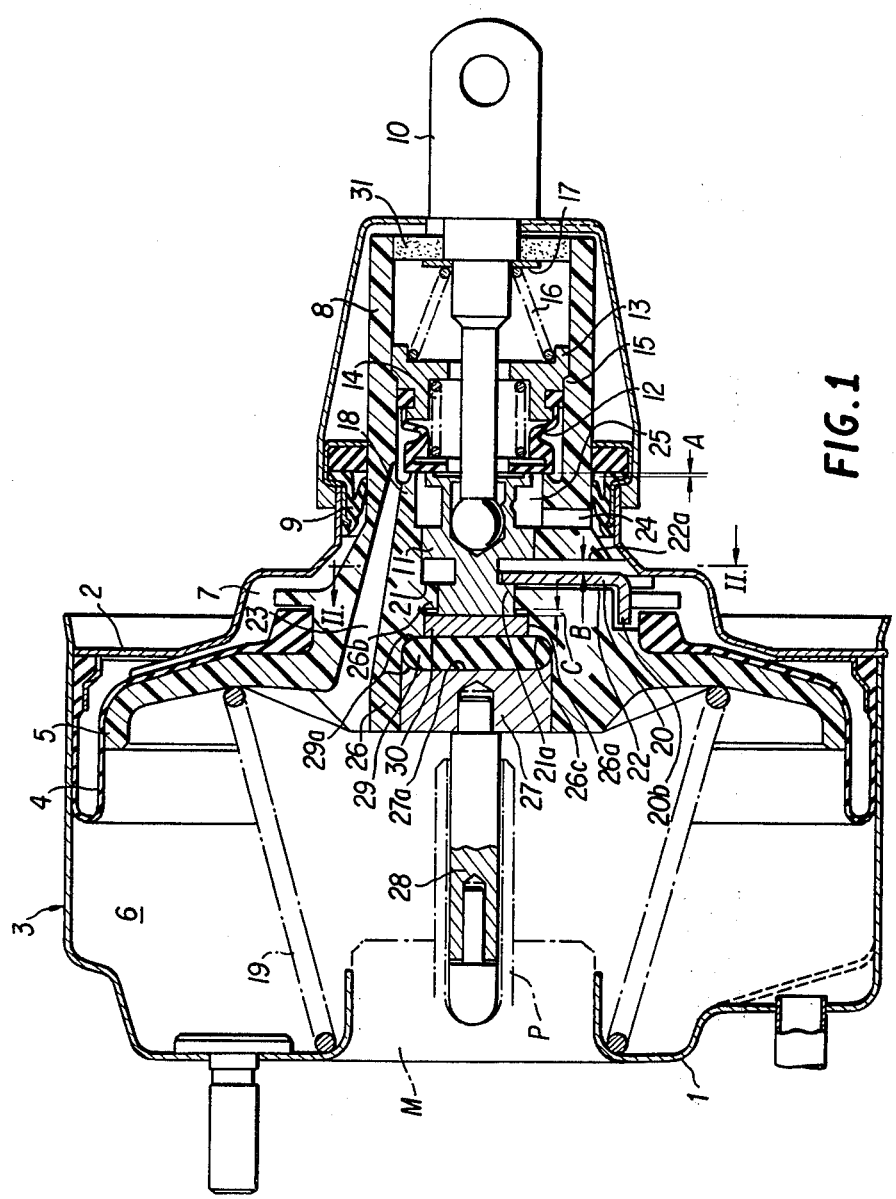
FIG. 1 discloses a preferred embodiment of the present invention.
Figure 2:
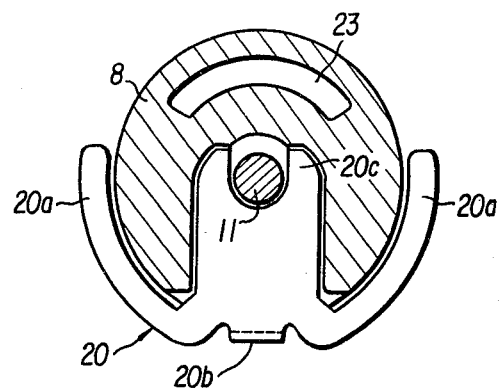
FIG. 2 is a view taken along lines II—II of FIG. 1.
Figure 3:
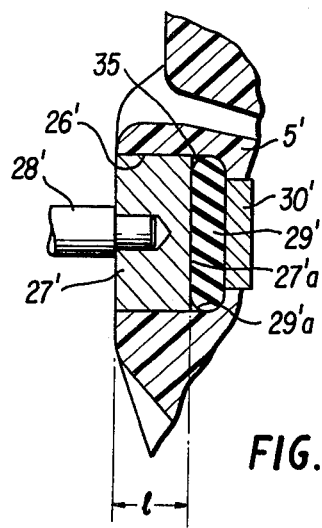
FIG. 3 represents a portion of a conventional brake booster assembly.

Referring now to the drawings and in particular, FIGS. 1 and 2, booster housing 3 includes two housing members 1 and 2 connected to each other. Diaphragm member 4 is secured at its outer peripheral portion between the two housing members and serves as a seal member therebetween. The diaphragm member 4 is inserted at its inner peripheral portion into an annular groove provided on power piston 5. Thus the interior of housing 3 is divided into two chambers 6 and 7 by the power piston 5 and the diaphragm member 4.

Power piston 5 has a central cylindrical extension 8 which extends through an extension of the housing member 2. The extension 8 of the piston 5 is slidably and sealingly movable in the extension of the housing member 2. Reference numeral 9 designates a seal ring interposed between the extensions of the housing member 2 and the power piston 5.

A push rod 10 is operatively connected to a brake pedal (not shown) at the right end thereof and is connected to an air valve 11 through a ball joint at the left end thereof. Air valve 11 is slidably disposed in the extension 8 of the power piston 5.

A control valve 12 is disposed in the power piston extension 8 next to and coaxial with the air valve 11. Control valve 12 is at its rear end (i.e., right end as viewed in FIG. 1) secured to a retainer member 13 which is secured to a shoulder 15 of extension 8.

A spring 14 is disposed between the retainer member 13 and the control valve 12 for biasing the latter. Another spring 16 is disposed between the retainer member 13 and a ring member 17 attached to the push rod. Power piston 5 is continuously biased toward the right as viewed in FIG. 1 by a spring 19 which is disposed in the chamber 6.

A key member 20 is disposed in a hollow portion 22 of the power piston 5 and an annular groove 21 provided on the air valve 11. Key member 20 has a fork-shaped portion 20c contacting an inside wall of housing 5 in FIG. 1, a pair of arm portions 20a and a projection 20b as shown in FIG. 2. Passages 23 and 24 are provided in the power piston 5.

Piston 5 is provided with a hollow cylindrical bore portion 26 in which a cylindrical member 27 is slidably disposed. Member 27 is connected to an output rod 28 operatively connected to a piston P of a master brake cylinder M fitted in the housing member 1 in an airtight manner.

A reaction disc plate 29 made of rubber is interposed within the cylindrical portion 26 of the piston 5 between the cylindrical member 27 and a force transmitting member 30. The cylindrical portion 26 has a small diameter portion 26a in which member 30 is slidably disposed. Rightward movement of the member 30 is limited to a distance C by an end wall portion 26b of the portion 26.

FIG. 1 shows the booster in the rest position. Chamber 6 is connected to an intake manifold of the engine (not shown) and during this rest position, the chamber 6 is communicable with chamber 7 through passage 23, space A between seat portion 18 of the piston 5 and the front face of the control valve 12, chamber 25 and passage 24.

The front face of the control valve 12 is in contact with the rear face of the air valve 11 and thus, air flow through air filter 31 is interrupted in its communication with both chambers 6 and 7. Key member 20 and side wall 22a of the hollow portion 22 in piston 5 are separated from each other by distance B as shown in FIG. 1. Distance B is designed to be larger than distance C between the end wall 26b and the right end surface of member 30.

When the brake pedal is depressed under the above conditions push rod 10 is moved to the left to shift air valve 11 towards the left. The control valve 12 is biased by spring 14 to the left so as to close the gap A between the seat portion 18 and the front face of the control valve 12. Accordingly, communication between the chambers 6 and 7 is interrupted.

Further depression of brake pedal moves the air valve 11 keeping the control valve in contact with seat 18. Thus, the front face of the control valve 12 and the right end of the air valve 11 are separated from each other to thereby introduce air through the air filter 31 into the chamber 7 through chamber 25 and passage 24.

The pressure difference between the chambers 6 and 7 causes power piston 5 to move to the left overcoming the force of spring 19. This leftward movement of power piston 5 is transmitted to the brake master cylinder piston P through output rod 28.

The brake pedal depression force is transmitted to the reaction disc plate 29 through push rod 10, air valve 11 and force transmitting member 30, and the reaction force is transmitted both to piston 5 and the member 30. A part of the reaction force which corresponds to the pressure receiving area of the member 30 is transmitted to the brake pedal through the air valve 11 and push rod 10. The operator of the vehicle can feel the partial reaction force through the brake pedal and control of the braking operation can be accomplished.

When braking operation is completed and the brake pedal is released, air valve 11 is moved to the right by the force of spring 16 and reaction force transmitted from member 30 relative to the piston 5. This rightward movement of air valve 11 is limited by key member 20 which will be stopped at the side wall 22a of the hollow portion 22 in piston 5.

Due to the retraction of air valve 11 the front face of the control valve 12 comes in contact with the air valve to thereby interrupt communication between chamber 7 and atmosphere through air filter 31. Simultaneously, seat portion 18 is separated from the front face of the control valve 12 to thereby allow communication between the chambers 6 and 7. The air remaining in the chamber 7 is absorbed (sucked up) by the vacuum from the intake manifold through the chamber 6. Thus, power piston 5 is moved to the right (to the position shown in FIG. 1) by the force of spring 19 and every component is returned to its original position shown in FIG. 1.

Cylindrical member 27 has at its extreme right end a rounded or concave surface 27a for fittingly receiving the reaction disc plate 29 which also has a complementary rounded or convex surface 29a at its left end. Similarly, cylindrical portion 26 of power piston 5 has a rounded or concave surface 26c at its right end for receiving the reaction disc plate 29 which also has a complementary rounded or convex surface at its right end. Accordingly, no gap or space is formed between cylindrical member 27 and reaction plate 29 and between cylindrical portion 26 and reaction plate 29. Since the right end of member 27 has a concave shape, the longitudinal length (l) of the member 27 can be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A brake booster for an automobile including a brake master cylinder and a brake pedal comprising:
  a housing;
  power piston means including a central cylindrical portion and a diaphragm disposed within said housing;
  a vacuum source;
  first and second chambers having a first passage therebetween and divided within said housing by said power piston means, said first chamber being continuously connected to said vacuum source, said second chamber being alternatively connected to said first chamber and to atmospheric pressure;
  output means connected to said power piston means for actuating said brake master cylinder in response to movement of said power piston means;
  control valve means disposed in said first passage between said first and second chambers for controlling communication therebetween;
  air valve means including a second passage formed between said second chamber and atmosphere and a valve for controlling communication therebetween;
  a push rod operatively connected to said brake pedal for controlling on-off operation of said control valve means and said air valve means, said push rod being connected to said brake pedal;
  said central cylindrical portion of said power piston forming a bore with a rounded end corner surface;
  wherein said output means further comprise:
  a cylindrical member slidably disposed in said bore of said central cylindrical portion,
  a reaction disc plate disposed in said bore of said central cylindrical portion, one side surface of said reaction disc plate being in contact with an end surface of said bore of said central cylindrical portion and an opposite surface thereof being in contact with an end surface of said cylindrical member;
  wherein each of said side surfaces of said reaction disc plate further comprises a rounded surface complementary to said rounded end corner surface of said bore of said central cylindrical portion, and wherein said end surface of said cylindrical member further comprises a rounded surface complementary to said rounded surface of each side surface of said reaction disc plate and which is in full surface contact with one of said side surfaces of said reaction disc plate.

2. A brake booster as set forth in claim 1, wherein said rounded surface of said reaction disc plate further comprises a convex surface and said end surface of said cylindrical member further comprises a concave surface.

3. A brake booster as set forth in claim 1, wherein said rounded surface of said opposite side of said reaction disc plate further comprises a convex surface and said rounded surface on said cylindrical bore futher comprises a concave surface.

4. A brake booster as set forth in claim 2, wherein said rounded surface of said opposite side of said reaction disc plate further comprises a convex surface and said rounded surface on said cylindrical bore further comprises a concave surface.

5. A brake booster as set forth in claim 1, further comprising a key member operatively associated with said air valve means for limiting movement of said air valve means upon release of braking operation.

* * * * *